United States Patent [19]

Zachary

[11] Patent Number: 5,013,280
[45] Date of Patent: May 7, 1991

[54] DEVICE FOR SECONDARY SEPARATION OF GRAIN IN A COMBINE HARVESTER

[76] Inventor: Alain Zachary, VONCQ, 08400 Vouziers, France

[21] Appl. No.: 480,494

[22] Filed: Feb. 16, 1990

[30] Foreign Application Priority Data

Feb. 20, 1989 [FR] France .................. 89 02197

[51] Int. Cl.⁵ .................. A01F 12/44; A01D 41/2
[52] U.S. Cl. .................. 460/80; 209/24; 209/289; 460/82; 460/100
[58] Field of Search .................. 460/80, 98, 99, 100, 460/102, 69, 84; 209/289, 24, 25

[56] References Cited

U.S. PATENT DOCUMENTS

| 413,161 | 10/1889 | Beeman | 209/289 |
| 772,331 | 10/1904 | Baxter | 209/289 |
| 3,425,423 | 2/1969 | McKenzie | 460/82 |
| 3,776,242 | 12/1973 | Khan | 460/80 X |
| 4,131,161 | 10/1889 | Beeman | 209/289 |
| 4,198,802 | 4/1980 | Hensen et al. | 460/80 X |
| 4,284,086 | 8/1981 | Williams | 460/80 X |
| 4,897,072 | 1/1990 | Bestland | 460/100 X |
| 4,915,826 | 4/1990 | Nordhus | 209/288 |

FOREIGN PATENT DOCUMENTS 767207 2/1952 Fed. Rep. of Germany .
2208275 6/1974 France .
111731 9/1925 Switzerland .

*Primary Examiner*—Stephen J. Novosad
*Attorney, Agent, or Firm*—Hoffman, Wasson & Gitler

[57] ABSTRACT

The secondary grain separator comprises an outer drum (12) constituted by at least two successive perforated lengths (18, 20, 22) having different mesh sizes, a feed chute (24) at the upstream end of the drum for pouring substances into the drum for separation along a vertical tangent, a curved wall (14) situated inside the drum and running from the chute at least as far as the bottom of the drum and defining an annular gap (16) for receiving the substances to be separated, deflector fins (30) inside the drum and inclined relative to the drum axis, and a collecting volute (34) surrounding the drum and including radially extending partitions (40, 42) defining collecting channels (44, 46, 48) facing the various lengths of the drum.

12 Claims, 4 Drawing Sheets

DEVICE FOR SECONDARY SEPARATION OF GRAIN IN A COMBINE HARVESTER

The invention relates to a device for secondary separation of grain in a combine harvester.

Combine harvesters generally include devices for secondary separation constituted by oscillating grids and trays, and these contribute to making such machines complex. In addition, in combine harvesters having oscillating grids and trays, it is essential for the grids and trays used for performing secondary separation to be mounted on slope-correcting devices. Such trays become much less efficient when a combine harvester is moving over sloping ground.

These constraints considerably increase the cost of such machines.

The present invention provides a device for secondary separation of grain in a combine harvester, the device being characterized in that it comprises a rotary outer drum having a horizontal axis and comprising at least two perforated lengths in succession from an upstream end to a downstream end, a feed chute situated at the upstream end of the outer drum for pouring substances to be separated into the drum substantially along a vertical tangent to the outer drum, at least one curved wall situated inside the outer drum running from the feed chute down to a bottom zone of the outer drum and defining, together with the outer drum, an annular gap for collecting substances, a plurality of deflector fins projecting into the outer drum and inclined relative to the drum axis, a collecting volute surrounding at least a portion of the outer drum and including one or more parallel radially-directed partitions defining collection channels facing the successive lengths of the outer drum.

Details and advantages of the invention appear clearly from reading the following description made with reference to the accompanying drawings, in which.

Figure 1:
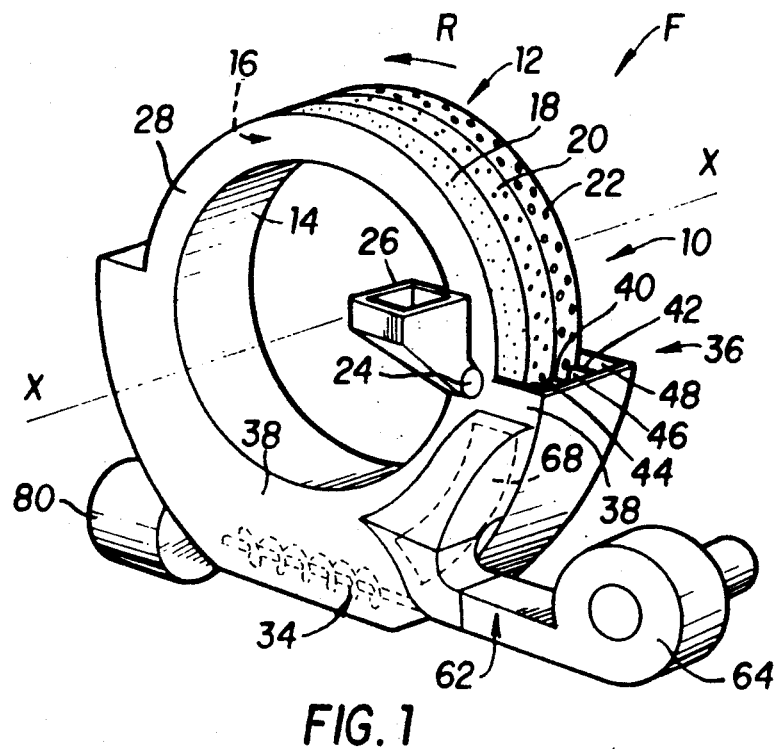
FIG. 1 is a diagrammatic perspective view of a separator in accordance with the invention.
Figure 2:
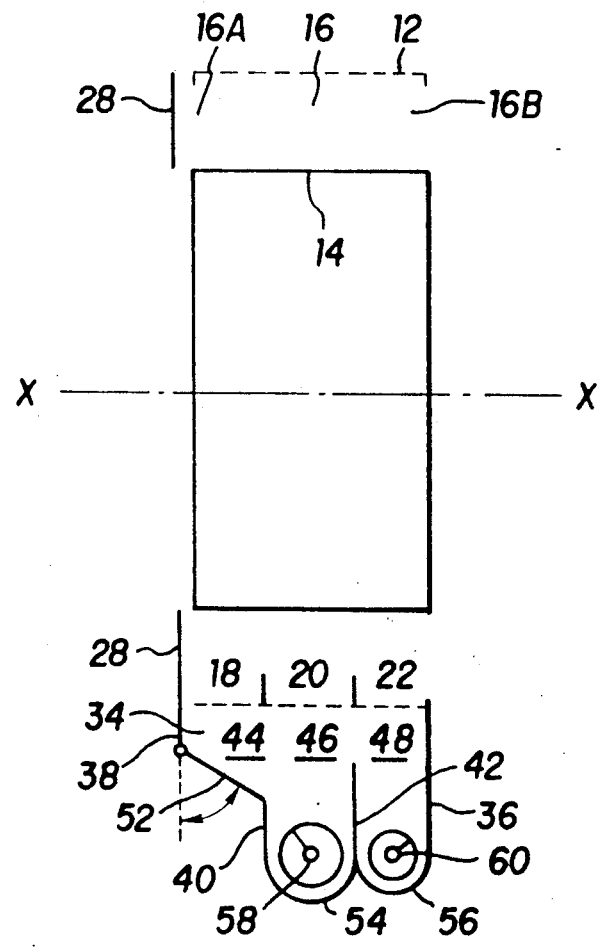
FIG. 2 is a diagrammatic vertical axial section view through the separator.

The secondary separator 10 of the present invention comprises a horizontal axis outer drum 12 and a coaxial inner counter-drum 14 which together define an annular gap 16 for receiving the substances to be separated.

The inner drum 14 has a solid wall whereas the outer wall 12 is perforated so as to form a screen.

More precisely, the outer drum is constituted by three successive lengths 18, 20, and 22 constituting screens of increasing mesh size. The first screen 18 to the left of FIG. 1 and at the upstream end of the separator has a relatively small mesh size and is intended to pass fragments of earth, small stones, and other very small-sized debris.

The second screen 20, in the middle, has a mesh size corresponding to the size of grain being harvested, and the third or righthand screen at the downstream end has a larger mesh size corresponding to the normal size of ear fragments that may still be carrying several grains not removed therefrom by the thresher or by the primary separator.

Substance to be separated is fed in via a chute 24 fixed to the base of a hopper 26. The chute opens out into the annular gap 16 between the two drums on the upstream side thereof and substantially in a zone where the tangent to the drums 12 and 14 is vertical.

The upstream end of the annular gap 16 is almost completely closed by means of an annular closure plate 28, whereas its downstream end is open, so that substance inserted at the upstream end can escape only by passing through a screen or else by leaving through the downstream end. In addition, as explained below, this disposition ensures that any flow of forced air from the outside of the drum can escape only via the downstream end of the gap.

Figure 3:
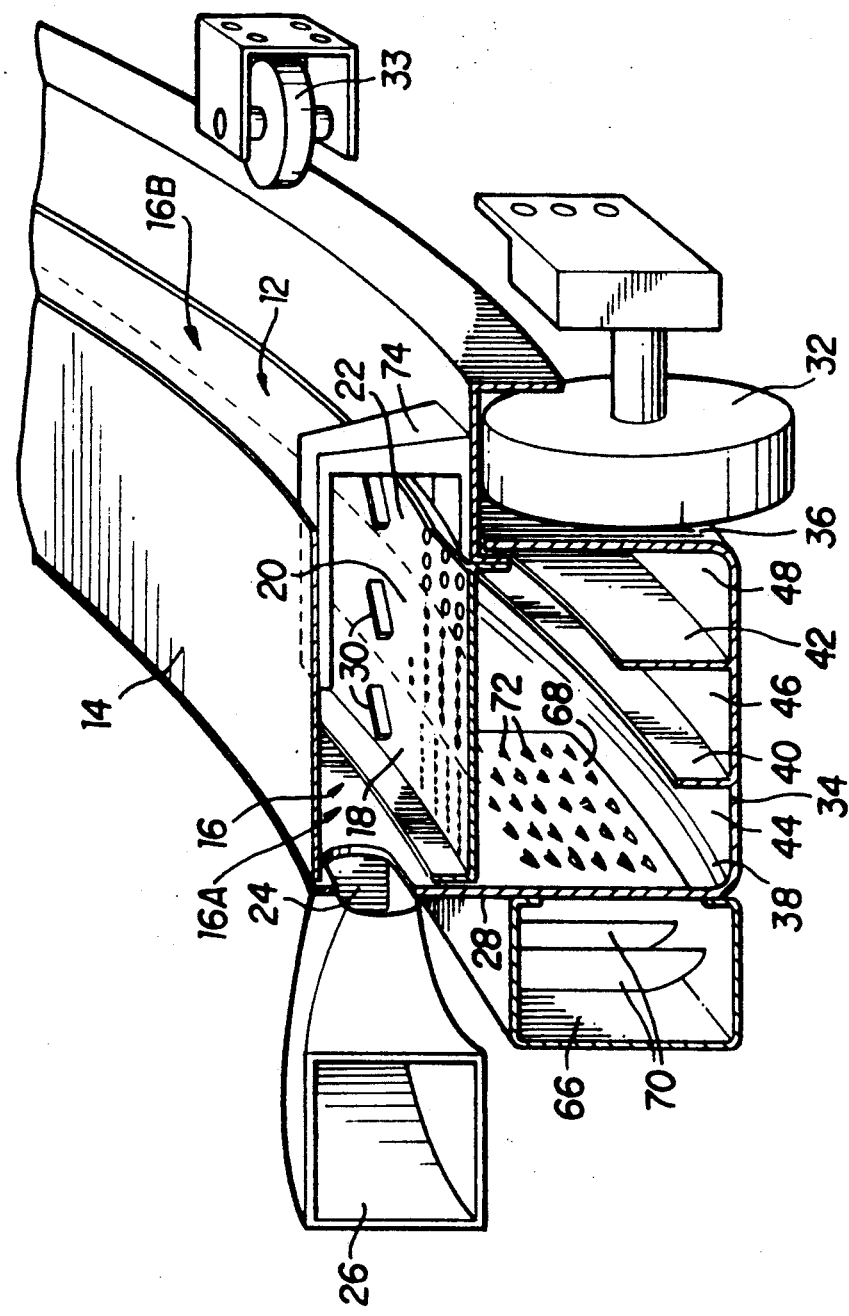
FIG. 3 is a perspective view in section through the feed chute and the air-blowing plenum chamber, as seen along arrow F of FIG. 1.

As can be seen in FIG. 3, a plurality of deflector fins 30 are disposed to project into the outer drum 12 and are inclined substantially helically relative to the drum axis X—X.

The fins 30 are inclined in such a direction that when the drum is rotating in the direction shown by arrow R in FIG. 1, then the injected substances are progressively entrained from the upstream end 16A towards the downstream end 16B of the annular gap 16.

Given its large diameter, the drum 12 is held in place and rotated by means of wheels 32 disposed around its periphery, with there being preferably three such wheels: two serving merely for support and guidance purposes; while the third wheel also serves to drive the drum by means of a motor which drives the wheel. Wheels 33 may also be provided for holding the drum axially in position.

A collecting volute 34 is disposed around the outer drum 12 for the purpose of separately collecting the substances which pass through the three lengths 18, 20, and 22 of the drum 12.

The volute has a channel section whose two flanges 36 and 38 are substantially perpendicular to the drum 12 and they terminate a short distance away therefrom.

Two intermediate radial partitions 40 and 42 extend parallel to the flanges 36 and 38 from the web of the channel section, towards the drum, and up to a certain distance therefrom, in such a manner as to define three collecting channels 44, 46, and 48 which are parallel and which face each of the three lengths 18, 20, and 22 of the drum 12.

Insofar as the first channel 44 is intended to receive non-usable substances, its bottom is open so as to allow these substances to fall to the ground.

The middle collecting channel 46 terminates at the bottom in the form of a trough 54 fitted with an archimedes screw for removing the grain proper to a tank (not shown).

The bottom of the downstream collection channel 48 is terminated by a trough 56 also fitted with an archimedes screw 60 and intended to transfer grain-containing ear fragments to a thresher 80 specific thereto.

In a variant, in particular for harvesting crops with very small-sized grains, e.g. oil seed rape, the bottom of the first channel 44 may be put into communication with the bottom of the second channel 46, by means of a hinged flap 52.

In practice, it is observed that grains of rape are generally situated more than 6 inches above the ground, and as a result the cutter bar can be adjusted to such a height as to avoid picking up any earth.

When harvesting rape, there are no grain-containing ear-fragments, so the third section 22 of the drum could be omitted. However, in practice, in order to make machines which are multi-purpose, three sections are provided in all machines, and the grain collected via the third channel 48 is recombined with the grain collected via the second and conveyed to the storage tank when harvesting rape, in which case the thresher for ear fragments is short-circuited and, if necessary, stopped so as to avoid driving machinery pointlessly and thus avoid wasting fuel.

An appropriate arrangement of flaps at the bottoms of the collection channels in the volute thus make it possible to isolate channels or to put them into communication with each other, or to put them into communication with the outside.

Finally, the separator includes a blower separator circuit 62 for maintaining a flow of air to entrain low-density waste. This circuit comprises a blower 64 blowing air into a plenum chamber 66 attached to a side orifice 68 of the collecting volute 34, formed in the outside wall 38 adjacent to the first channel and beneath the grain feed chute 24. The plenum chamber 66 upstream from the orifice 68 is fitted with deflector vanes 70 which direct the flow of air to be substantially parallel with the drum axis and the orifice 68 is fitted with deflector fins 72 for deflecting the flow of air towards the outer surface of the drum 12.

By virtue of these dispositions, the air blown from the plenum chamber 66 into the volute 34 passes through the multiple holes in the drum 12 from the outside towards the inside as a counterflow to the substances passing through the screen into the volute, and then escapes via the gap 16 between the outer drum 12 and the inner drum 14, going from its upstream end 16A towards its downstream end 16B and entraining light substances such as dust, chaff, and small bits of straw which are then ejected via said downstream end and fall naturally to the ground.

It should be observed that separation is made highly effective by the fact that the mixture of grains and impurities is subjected to the flow of air while it is falling from the chute 24 into the rotary drum 12. The drum is caused to rotate in the appropriate direction to ensure that counterflows occur, thereby increasing the effectiveness of the separator.

Variants of the invention as described above are possible, as described below.

When the machine includes a primary separator drum, as described in French patent document No. FR-A-2 382 847 or in French patent application No. FR 88 13 588, it is advantageous to associate the secondary separator drum with the primary separator drum.

To this end, the downstream end of the primary separator drum includes a non-perforated section which then constitutes the inner drum of the secondary separator with the perforated drum of the secondary separator being mounted thereabout.

Advantageously, the primary separator drum includes a plurality of supports 74 regularly spaced apart around its periphery for receiving the cylindrical sectors of calibrated gratings which together constitute the successive lengths 18, 20, and 22 of the outer drum 12 of the secondary separator.

These sectors are thus easily removable and replaceable by perforated sectors having different mesh sizes, depending on the nature of the crop being harvested.

In a variant, the outer drum 12 is perforated with variable mesh size and adjustable gratings are provided for the three successive lengths 18, 20, and 22 in order to close the openings through the outer drum to a greater or lesser extent in order to obtain screens of selected mesh size which are adjustable on demand.

Figure 5:
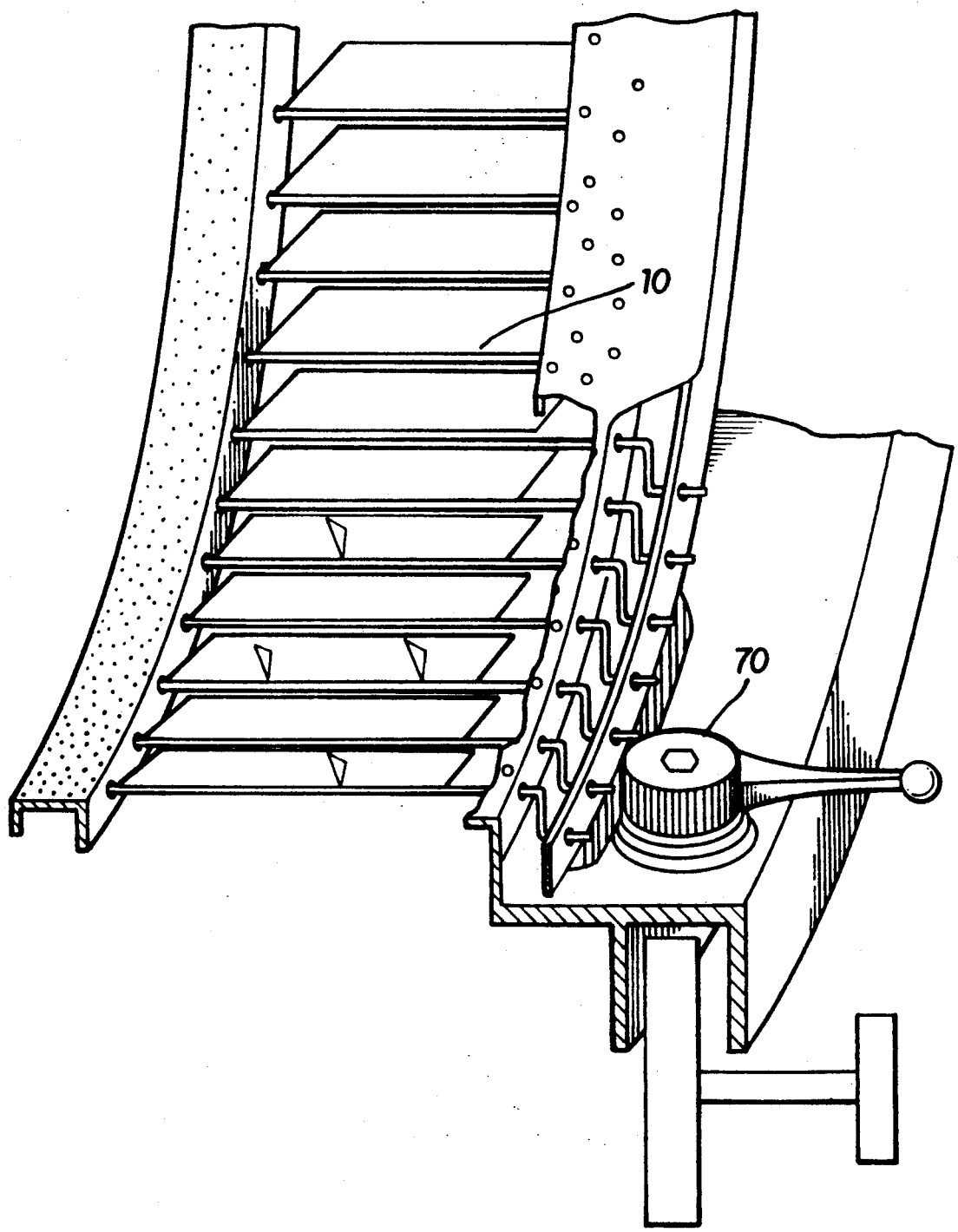

The grids could be plane, in which case the section of the separator drum would be a regular polygon, having as many sides as there are grids. A device as disclosed in FIG. 5 can be used in all cases for adjusting the set of elementary grids 10 by means of a single control 70.

Figure 4:
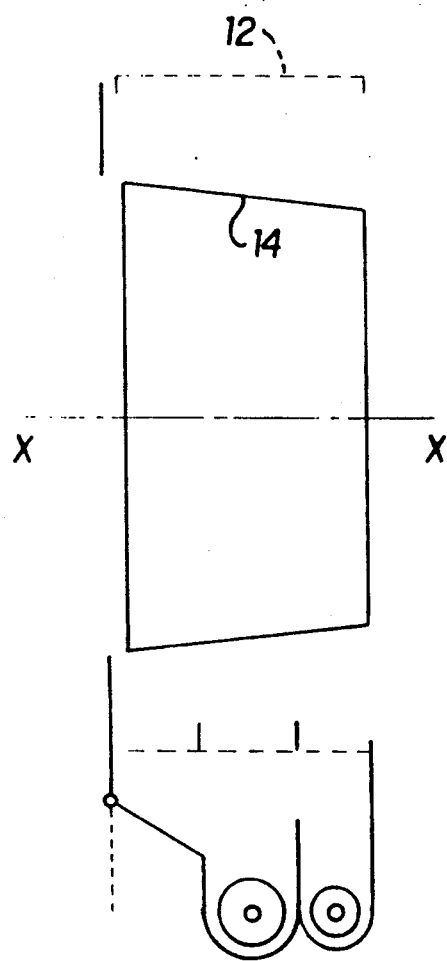

Regardless of whether the secondary drum is associated with a primary separator drum or is independent, the inner and/or the outer drum could be somewhat conical in shape in order to prevent substance from clogging on the inside face of the outer drum. (see FIG. 4)

To this end, the inner drum 14 could be frustoconical, tapering towards the downstream end, and/or the outer drum 12 could be frustoconical flaring towards the downstream end.

From results obtained during testing, it will be possible to leave the upstream end 16A of the gap 16 between the two drums 12 and 14 open. Insofar as the air blown into the volute 34 and then passing through the passages of the outer drum 12 is flowing in a direction generally directed from the upstream end 16A towards the downstream end 16B, it may be verified that air escapes via the downstream end 16B, and under some conditions benefit may be obtained by an induction effect sucking in a secondary air flow from the upstream end 16A.

When the secondary separator drum is not associated with a primary separator drum, the inner drum 14 could be reduced to a stationary curved wall facing the outer drum over a zone extending from the feed chute 24 down to the bottom of the drum or a little further.

The important feature is that substance flowing from the feed chute passes through a flow of air sweeping substantially horizontally therethrough in a zone where the substance begins by falling freely prior to falling against the inside wall of the drum.

I claim:

1. A device for secondary separation of grain in a combine harvester, the device being characterized in that it comprises a rotary outer drum (12) having a horizontal axis and comprising at least two perforated lengths (18, 20, 22) in succession from an upstream end to a downstream end, a feed chute (24) situated at the upstream end of the outer drum for pouring substances to be separated into the drum substantially along a vertical tangent to the outer drum, at least one curved wall (14) situated inside the outer drum running from the feed chute down to a bottom zone of the outer drum and defining, together with the outer drum, an annular gap (16) for collecting substances, a plurality of deflector fins (30) projecting radially inward from the outer drum, and inclined relative to the drum axis, a collecting volute (34) surrounding at least a portion of the outer drum and including one or more parallel radially-directed partitions (40, 42) defining collection channels (44, 46, 48) facing the successive lengths of the outer drum.

2. A device according to claim 1, characterized in that it also includes a blower separator device (62) blowing air into the collecting volute (34) through the outer drum (12) from its outside into the annular gap (16) for collecting substances, and in a direction substantially parallel to the axis of the drum from the upstream end of the drum towards its downstream end.

3. A device according to claim 2, characterized in that the curved wall constitutes an inner counter-drum (14) coaxial with the outer drum and fixed thereto.

4. A device according to claim 3, characterized in that the outer drum is constituted by removable cylindrical sectors of grids, mounted on supports (74) fixed to the inner drum.

5. A device according to claim 3, characterized in that at least one of the drums is slightly conical.

6. A device according to claim 3, characterized in that the inner drum is formed by a primary separator drum.

7. A device according to claim 3, characterized in that the inner and outer drums are supported by wheels (32, 33) regularly spaced apart around their peripheries, and in that they are driven by at least one of said wheels.

8. A device according to claim 3, characterized in that it includes an annular closure plate (28) between the inner drum and the outer drum, at the upstream end of the outer drum.

9. A device according to claim 3, characterized in that the blower separator device (62) comprises a plenum chamber (66) for blowing air, said chamber being disposed adjacent to the volute (34) and opening out into the volute via a blowing orifice (68) situated beneath the feed chute (24), and fitted with air flow directing vanes (66) and fins (72) for directing the flow of air towards the outside surface of the outer drum, and substantially parallel to the axis thereof.

10. A device according to claim 1, characterized in that the collecting volute (34) includes grain extracting members (58, 60) at the bottom of each of its collecting channels.

11. A device according to claim 1, characterized in that the collecting volute includes flaps (52) for isolating the channels from or putting them into communication with one another and the outside.

12. A device according to claim 1, characterized in that the lengths of the outer drum have adjustable mesh sizes.

* * * * *